March 22, 1966 W. FISHER 3,241,895
SEPARATION MEANS FOR SHAFT BEARINGS
Filed May 27, 1963 3 Sheets-Sheet 1

WALTER FISHER
INVENTOR

BY *Mason, Porter, Miller & Stewart*

ATTORNEYS

March 22, 1966    W. FISHER    3,241,895
SEPARATION MEANS FOR SHAFT BEARINGS
Filed May 27, 1963    3 Sheets-Sheet 2

WALTER FISHER
INVENTOR

BY *Mason, Porter, Miller & Stewart*

ATTORNEYS

WALTER FISHER
INVENTOR

BY Mason, Porter, Miller & Stewart

ATTORNEYS

United States Patent Office 3,241,895
Patented Mar. 22, 1966

3,241,895
SEPARATION MEANS FOR SHAFT BEARINGS
Walter Fisher, South Bend, Ind., assignor to The Torrington Company, Torrington, Conn., a corporation of Maine
Filed May 27, 1963, Ser. No. 283,333
1 Claim. (Cl. 308—236)

This invention relates generally to separation means for an antifriction shaft bearing which is press-fitted directly upon a shaft and more particularly relates to removing an inner race ring for an antifriction bearing assembly which is thus press-fitted to a tapered shaft.

In the past, much trouble has developed in connecting and disconnecting a conical bearing from a shaft when the inner race of such an antifriction conical bearing has been press-fitted to engage the shaft frictionally. Differential heating has been satisfactory and used to connect such bearings to their respective shafts, however, as the inner ring of the bearing and the shaft are in intimate press-fitted contact after the mounting has been completed, it is extremely difficult to apply heat to the bearing member apart from the shaft. Therefore the use of differential heat in such disconnection procedures has not been found entirely satisfactory.

Another method that has been utilized in the past for connecting and disconnecting a bearing from its shaft is the application of hydraulic fluids to the respective mating surfaces of the bearing and shaft. The penetrative and compressive effects of a material such as oil when forced between the press-fitted surfaces aids in their separation and if the fluid is transmitted thereto under high enough pressures, an expansion of the bearing members surrounding the shaft takes place so as to further facilitate both removal and mounting.

In the past this high pressure fluid has been transmitted through suitable channels formed within the shaft to the peripheral surface of that shaft in contact with the bearing member. Many bearing installations which utilize this type of connecting and disconnecting aid are extremely large in size and permanent in nature. In many cases this necessitates the required channels to be bored in situ, that is, at the permanent installation site of the shaft, especially in those cases where the shaft has not hitherto been provided with the necessary fluid transmitting channels. Also, from time to time it may be desirable to utilize different bearing structures with such a shaft. If the channels formed within the shaft are not then suitable for the new type or design of bearing, it is necessary to rechannel the shaft or be limited in the number of types and designs of bearing structures which may be used with a shaft already having channels of a specific configuration.

To alleviate the above-mentioned problems it has been recently proposed that an intermediate sleeve be positioned in press-fitting engagement to the shaft and that the necessary bearing housing rest upon the other surface of this intermediate member. The sleeve or intermediate member is then suitably bored so as to present channels opening at both the contacting surfaces of the bearing structure and the shaft. High pressure fluid is then transmitted through the channels so as to facilitate the ease in which the intermediate sleeve may be removed or placed upon the shaft. The bearing structure is accordingly either mounted or disconnected from the shaft through this intermediate sleeve member. The use of such an intermediate sleeve member is, however, an increase to the cost of the total installation and in many cases is not desirable when space and special structural requirements become closely limiting factors.

Applicant has discovered that the desirable features presented by the use of such an intermediate member may be accomplished without its accompanying disadvantages. To this end, applicant has provided the inner race rings of the bearing structure themselves with suitable channels so as to thus enable high pressure lubricating fluid to be transmitted to the frictionally engaged press-fitted surfaces. This avoids the need for an intermediate sleeve member as the inner race ring of the bearing cone is directly press-fittedly engaged to the shaft.

It is, therefore, an object of the invention to provide a shaft and bearing structure, which bearing structure can be removed from the shaft by means of high pressure fluid without the necessity of utilizing an additional sleeve member or channeling the shaft itself.

It is also an object of the invention to provide the inner race ring of a shaft and bearing assembly with suitable channels so that the bearing assembly may be easily removed from the shaft by means of high pressure fluid forced through those channels and between the co-acting surfaces of the shaft and the inner race ring of the bearing assembly so as to expand and lubricate the inner race ring for ready mounting and dismounting in relationship to the shaft.

A further object of the invention is the provision of a shaft and antifriction bearing assembly in which bearing cones are arranged in tandem butting relationship upon a shaft and which cones may be easily mounted and dismounted from the shaft in succession by means of high fluid pressure forced between the mating surfaces of each bearing cone and the shaft.

Still another object of the invention is the provision of an inner race ring for use with a shaft and antifriction bearing assembly, which inner race ring is suitably channeled for the admission of high pressure fluid to the mating surfaces of the shaft and inner race ring from an easily accessible point of entry provided on the outer wall of the inner race ring.

With the above and other objects in view, as will appear hereinafter, the nature of the invention will be more clearly understood by reference to the following detailed description and the accompanying drawings of the preferred form thereof.

In brief, the invention comprises a bearing assembly for a roll or shaft having the conical inner race member directly mounted on the shaft with provision for introducing a pressure fluid through the bearing member and in the interface between it and the shaft.

Figure 1:
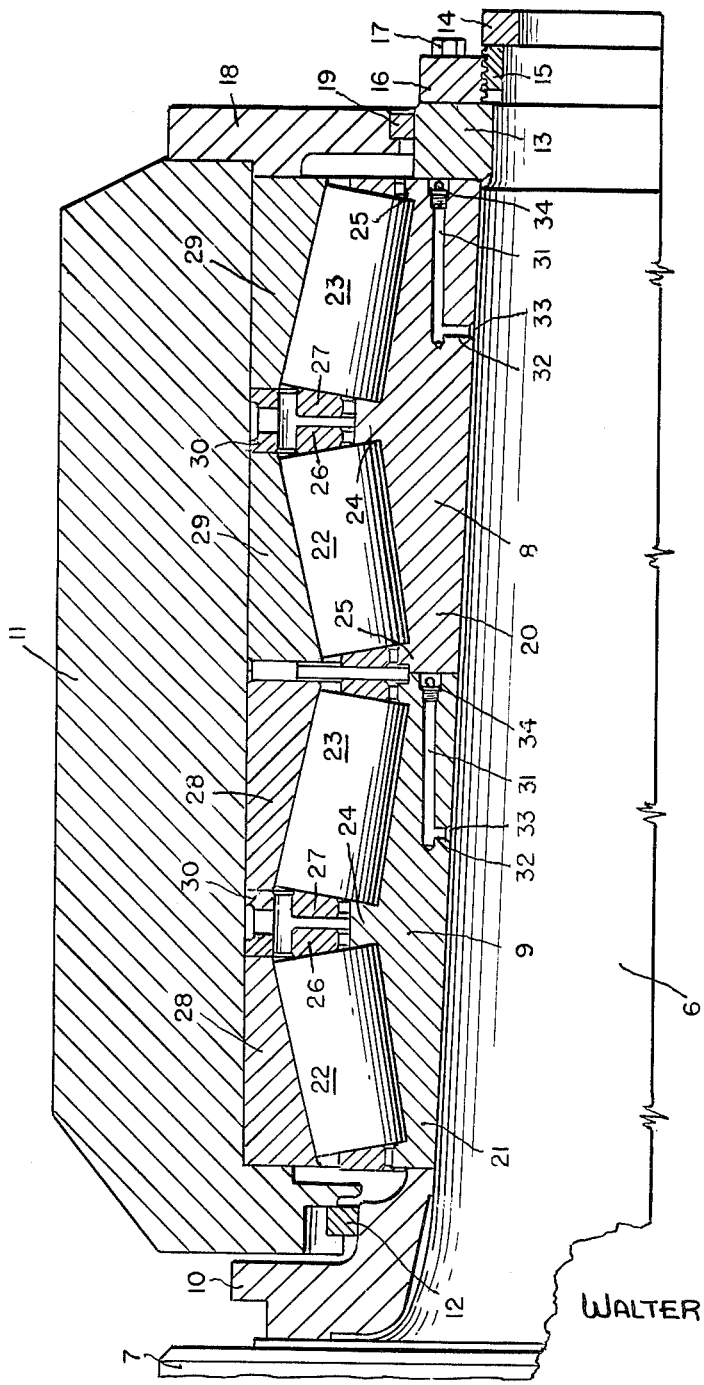
FIGURE 1 is a longitudinal sectional view of the usual shaft on which the improved anti-friction bearing assembly is mounted.
Figure 2:
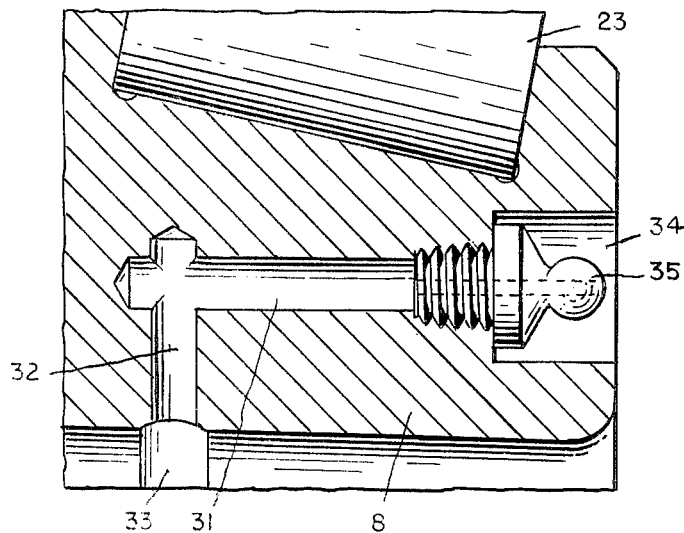
FIGURE 2 is an enlarged longitudinal sectional view of a portion of the inner race ring of the bearing assembly and shows in particular the location of the channels for the high pressure fluid.

As illustrating the essential features of the invention I have shown on the drawings the preferred form of the novel separation means for shaft bearings. In FIGURE 1 there is shown a tapered shaft 6 forming the end of a mill roll 7 or the like. This shaft 6 carries an outer bearing unit 8 and an inner bearing unit 9, which in operation are tightly clamped to the tapered shaft by means of their similarly tapered inner surfaces.

A shoulder ring 10 spaces the inner bearing unit 9 from the roll 7. A pillow block or housing 11 overlies both units 8 and 9. This housing 11 is spaced from the shoulder ring 10 by means of an oil ring or seal 12.

A compression collar 13 slidably fitted on the outer or small end of the shaft 6, fits against the outer end of the bearing 8.

A retainer ring 14 is fastened on the free end of the shaft 6. This retainer ring has a screw threaded sleeve 15 overlying the end of the shaft 6. This sleeve carries a screw threaded adjusting ring 16. Relative rotation of the adjusting ring 16 around the sleeve 15 applies compression to the collar 13 and thus indirectly to the bearing units 8 and 9.

A lock bolt 17 fastens the adjusting ring 16 in its final position on the compression collar 13.

A cover plate 18 is fastened to the housing 11 but is loosely spaced from the compression ring 13. An oil seal or dust ring 19 is fitted between the compression collar and the adjacent edge of the cover plate 18.

The inner race 21 of unit 9 has a similar taper fitting the taper of the shaft at the area of contact.

The bearing units 8 and 9 are similar in construction. The bearing unit 8 has a tapered inner race 20 conforming to the taper of the shaft 6. The race is a double cone with raceways inclined in opposite directions.

Each race carries two series of tapered rollers 22, 23 which have oppositely sloping axes and the conical surfaces are inclined in opposite directions.

The series of rollers are separated by a center flange 24. Outer flanges 25, 25 confine each of the series of rollers.

Each series of rollers has an individual spacer or cage 26, 27.

Separate outer races 28, 29 fit over the respective series of rollers 22, 23.

A center ring 30 separates the outer races 28, 29. The outer race 29 abuts a shoulder on the cover plate 18.

With reference to the outer bearing unit 8 it will be seen that it has been drilled longitudinally to provide a passageway 31. The inner end of the passageway 31 terminates in a radial port, which connects with a peripheral groove 33.

The outer end of the passageway 31 is provided with an enlarged chamber 34. This chamber 34 contains a screw threaded coupling 35 which screws into the passageway 31. The coupling has an axial opening, so that access is given to the passageway 31.

The chamber 34 is closed by the compression collar 13.

The inner bearing unit 9 is similarly provided with a passageway 31 having a radial port 32 and connecting with a peripheral groove 33. Similarly there is a chamber 34 at the outer end of the passageway and this carries a screw threaded coupling 35. The chamber 34 in this instance is blocked by the opposite end of the inner race 20 of the outer unit 8.

By locating the coupling and the passageway in the inner race members themselves, provision is made for the direct application of a pressure fluid such as luibricating oil into the interface between the mating surfaces of the shaft and the race members 20 and 21.

In disassembly of the bearing and removing the bearing units, the lock bolt 17 is removed. The adjusting ring 16 may then be rotated relatively to the sleeve 15. With this tension relieved, the retainer ring 14 may then be removed with the sleeve 15 and the ring 16. Thus the compression on the roller 13 is removed. By removing the cover plate 18, the end of the outer bearing unit 8 is exposed. Compression fluid such as lubricating oil applied under pressure through the coupling 35, is led directly to the interface between the race member 20 and the shaft. The liquid pressure greatly facilitates the dislodgment of the race member 21 from its grip on the shaft 6. The bearing unit may then be removed readily by longitudinal pulling.

The operation is then repeated applying fluid pressure between the inner race member 21 and the shaft. This enables the inner bearing unit 9 to be separated from the shaft and withdrawn longitudinally.

Figure 3:
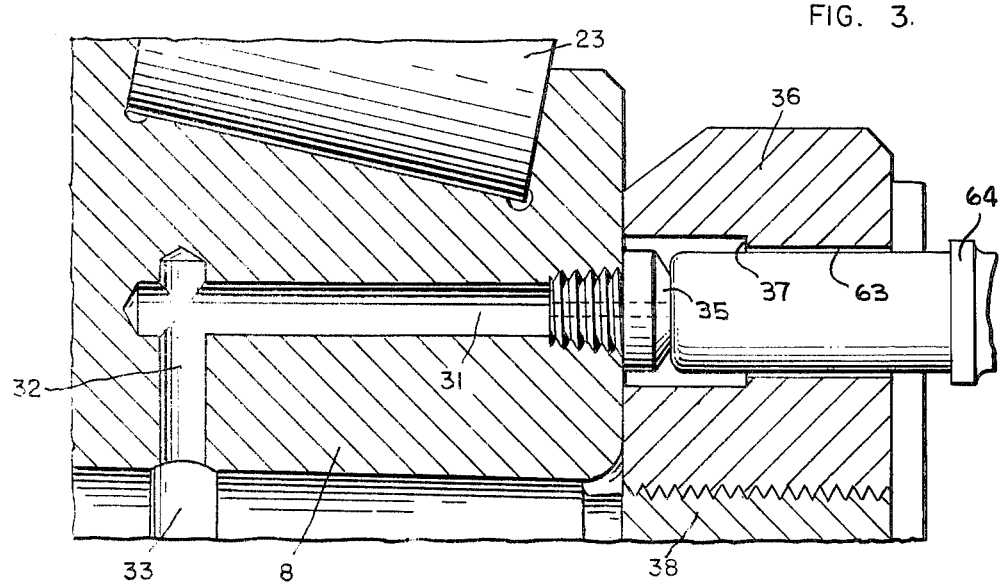
FIGURE 3 is a similar sectional view of a portion of the shaft and a modified form of bearing assembly by which high pressure fluid may be introduced between the engaged surfaces of the inner race and the shaft.

A modification of the invention is illustrated in FIGURE 3. Here the tubular fitting is screw threaded into the end of the passageway 31, but fits against the end wall of the inner race 20. The locknut 36 has an annular groove 37 to receive the fitting 35. An inner sleeve 38 is provided to apply the axial compression on the locknut against the face of the inner ring 8 for holding the bearing unit in place.

For hydraulically removing the ring 8 from the shaft, the locknut 36 is backed off from the face of the inner ring. However the loose locknut remains as an abutment too great longitudinal movement of the ring 8.

One or more holes 63 in locknut 36 permit the insertion of the fitting 35 through locknut 36 and on the end of the tube 31. The usual high pressure coupling 64 may then be attached.

Application of fluid pressure to the fitting 35 in this instance follows the same sequence as above described. Thus provision is made for readily separating the bearing unit from the tapering shaft within.

Figure 4:
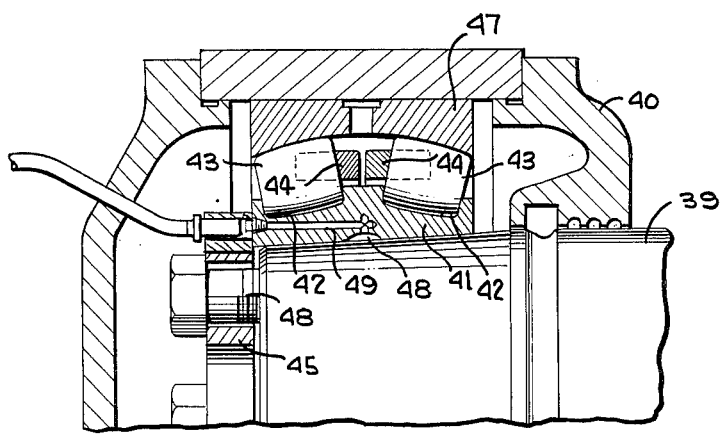
FIGURE 4 is an enlarged longitudinal sectional view of a self-aligning spherical roller bearing equipped for ease in disassembly.

The form of the invention in FIGURE 4 is illustrated as a self-aligning, spherical roller bearing having an easily removable inner race. It is mounted upon the tapered end of a shaft 39. It is surrounded by a housing 40.

The bearing proper consists of an inner tapered race 41 which fits upon the tapered shaft 39. The inner race carries two raceways 42, 42 of the usual form and arrangement.

Two series of spherical bearing rollers 43, 43 are held in the raceways 42, 42. Individual retainers 44, 44 are provided for each series of rollers.

The inner race 41 is tightly clamped upon the tapered end of the shaft 39 by means of a retainer ring 45. This is held in position by a series of bolts 46.

The outer race 47 has the usual spherical inner raceway.

The inner race 41 is provided with a peripheral oil groove 48. An oil duct 49 connects the groove with the outer end of the race, providing a connection by an oil pressure pipe. After the ring 45 has been loosened, the oil pressure pipe is connected to the duct 49. Oil pressure delivered to the groove 48 reacts between the shaft 39 and the inner race 41 to loosen the latter and facilitate its endwise removal.

Figure 5:
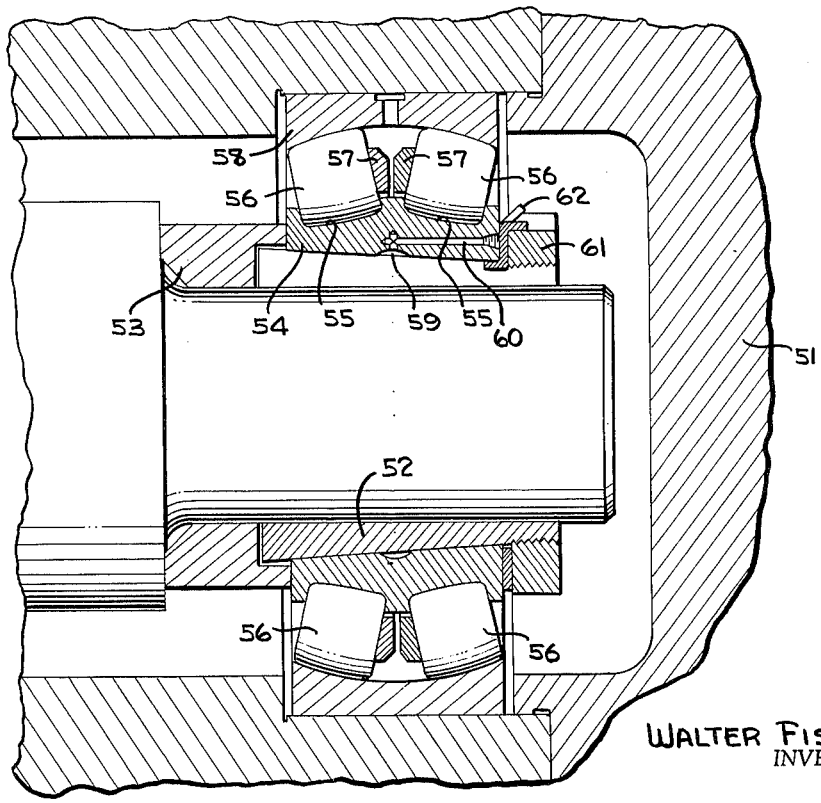
FIGURE 5 is a similar view of a modified form having a shaft sleeve.

In the event that the end of the shaft is cylindrical, a tapered, conical adaptor is used within the inner race. The removal of the inner race from such an adaptor is illustrated in FIGURE 5. Here the shaft 50 is cylindrical within the housing 51. An adaptor sleeve 52 is provided which has a cylindrical bore and a conical outer surface. It is firmly attached to the shaft 50.

An inner spacing ring 53 is provided on the end of the shaft 50 between the shoulder of the shaft and the inner end of the tapered sleeve 52.

This inner race has the customary two raceways 55, 55, each supporting an independent series of spherical rollers 56, 56. These series are held by retainers 57, 57.

The outer race 58 has a spherical inner surface conforming to the spherical rollers 56, 56, in the usual manner.

The inner tapering surface of the inner race 54 is provided with a circumferential oil groove 59. This is connected by a duct 60 to the outer end of the race. At that point provision is made for the attachment of an oil pressure pipe when it is desired to remove the inner race.

The inner race is held in tight engagement by means of the screw threaded retaining ring 61. This is locked into position by means of the intermediate lock washer 62.

Removal of the ring 61 and the lock washer 62 permits application of the oil pressure to separate the inner race from the tapered sleeve.

The present design of structure by which the inner ring itself provides access for pressure fluid into the interface with the shaft, avoids the use of an intermediate spacing collar through which to apply compression fluid on the shaft surface. By using the inner race member for this purpose, material reduction is made in the mass of the rotating member of the bearing unit. In like manner, the space required between the shaft and the pillow block for housing is essentially reduced, thus producing an advantage where there is a limitation on space.

What I claim is:

A quickly demountable antifriction bearing for a shaft comprising an outer race member, an inner race member and an intermediate antifriction element, said inner race member having a longitudinal passageway, and a connecting port from the passageway to the inner surface of said inner race member, a locknut against the end of the inner race member, an annular groove in the locknut opposite the longitudinal passageway, said locknut having a hole in alignment with said longitudinal passageway and a high pressure fitting for insertion through said hole and into said passageway.

References Cited by the Examiner
UNITED STATES PATENTS

| | | | |
|---|---|---|---|
| 2,348,293 | 5/1944 | Hamer | 308—237 |
| 2,564,670 | 8/1951 | Bratt | 308—236 |
| 2,749,192 | 6/1956 | Kort | 308—236 |
| 2,840,399 | 6/1958 | Harless et al. | 29—421 |
| 2,939,750 | 6/1960 | Weckstein | 308—236 |
| 2,980,474 | 4/1961 | Gargan | 308—236 |
| 3,108,839 | 10/1963 | Johnson | 29—148.4 |
| 3,149,404 | 9/1964 | Sims | 29—421 |

DON A. WAITE, *Primary Examiner.*

ROBERT C. RIORDON, *Examiner.*